(12) United States Patent
Chun

(10) Patent No.: US 10,837,301 B2
(45) Date of Patent: Nov. 17, 2020

(54) STRUCTURE FOR MULTI-STAGE SEALING OF TURBINE

(71) Applicant: DOOSAN HEAVY INDUSTRIES CONSTRUCTION CO., LTD., Gyeongsangnam-do (KR)

(72) Inventor: Hong Young Chun, Seoul (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 598 days.

(21) Appl. No.: 15/387,176

(22) Filed: Dec. 21, 2016

(65) Prior Publication Data
US 2017/0198597 A1    Jul. 13, 2017

(30) Foreign Application Priority Data

Jan. 11, 2016  (KR) .......... 10-2016-0003210

(51) Int. Cl.
*F01D 11/02* (2006.01)
*F16J 15/447* (2006.01)

(52) U.S. Cl.
CPC .......... *F01D 11/02* (2013.01); *F16J 15/447* (2013.01); *F05D 2250/283* (2013.01)

(58) Field of Classification Search
CPC ........ F01D 5/225; F01D 11/001; F01D 11/02; F01D 11/025; F01D 11/08; F01D 11/122;
(Continued)

(56) References Cited

U.S. PATENT DOCUMENTS 1,708,044 A * 4/1929 Baumann .............. F01D 11/001
277/418
2,242,673 A * 5/1941 Hanzlik .................. F01D 11/02
277/419

(Continued)

FOREIGN PATENT DOCUMENTS

JP       4220631 B    4/2001
JP    2001-123803 A   5/2001
(Continued)

OTHER PUBLICATIONS

An extended European search report issued by the European Patent Office dated Mar. 12, 2017 in corresponding European Application No. 16202566.2.

(Continued)

*Primary Examiner* — Courtney D Heinle
*Assistant Examiner* — Sang K Kim
(74) *Attorney, Agent, or Firm* — Invenstone Patent, LLC

(57) ABSTRACT

Disclosed herein is a structure for multi-stage sealing of a turbine, including: an annular multi-stage sealing part disposed on an inner circumferential surface of a fixed body and having different heights of at least two stages; a barrier unit disposed at a central side of the multi-stage sealing part on the inner circumferential surface of the fixed body; and an annular multi-stage tooth part disposed to face the multi-stage sealing part or the barrier unit over an outer circumferential surface of a rotating body and provided with a plurality of teeth, having a relative height corresponding to different heights of the multi-stage sealing part or the barrier unit at an interval between the fixed body and the rotating body.

8 Claims, 8 Drawing Sheets

(58) Field of Classification Search
CPC ............... F01D 11/127; F05D 2240/56; F05D 2250/283; F16J 15/447
See application file for complete search history.

(56) References Cited

U.S. PATENT DOCUMENTS

| | | | |
|---|---|---|---|
| 4,420,161 A | 12/1983 | Miller | |
| 5,026,075 A * | 6/1991 | Massarani | ............... F01D 11/02 277/419 |
| 5,599,026 A | 2/1997 | Sanders et al. | |
| 5,749,584 A * | 5/1998 | Skinner | ................... F01D 9/023 277/355 |
| 6,131,910 A * | 10/2000 | Bagepalli | ................ F01D 5/225 277/355 |
| 6,131,911 A * | 10/2000 | Cromer | ................ F01D 11/001 277/355 |
| 6,790,001 B2 * | 9/2004 | Turnquist | ............... F01D 11/02 415/174.2 |
| 8,128,351 B2 * | 3/2012 | Narita | ................... F01D 11/001 415/173.1 |
| 8,162,324 B2 * | 4/2012 | Deo | ...................... F01D 11/003 277/413 |
| 8,382,119 B2 * | 2/2013 | Awtar | ................... F01D 11/003 277/355 |
| 9,995,164 B2 * | 6/2018 | Nishijima | ............... F01D 11/02 |
| 2006/0249911 A1 | 11/2006 | Kowalczyk et al. | |
| 2014/0064909 A1 * | 3/2014 | Trivedi | ................. F01D 11/001 415/1 |
| 2015/0354390 A1 * | 12/2015 | Aksit | ...................... F01D 11/02 277/355 |
| 2015/0361815 A1 * | 12/2015 | Aksit | ...................... F01D 11/02 415/174.2 |
| 2019/0093500 A1 * | 3/2019 | Song | ...................... F01D 11/16 |

FOREIGN PATENT DOCUMENTS

| | | |
|---|---|---|
| JP | 2001123803 A | 5/2001 |
| JP | 2008223660 A | 9/2008 |
| JP | 2011-058494 A | 3/2011 |
| JP | 2013-185584 A | 9/2013 |

OTHER PUBLICATIONS

Office Action issued in corresponding Korean Application No. 10-2016-0003210, dated Dec. 21, 2016, 5 pages.

Japanese Office Action issued by the Japanese Patent Office dated Aug. 15, 2017 in connection with Japanese patent application No. 2016-220565.

* cited by examiner

Related art

STRUCTURE FOR MULTI-STAGE SEALING OF TURBINE

CROSS-REFERENCE TO RELATED APPLICATION

This application claims priority to Korean Patent Application No. 10-2016-0003210, filed on Jan. 11, 2016, the disclosure of which is incorporated herein by reference in its entirety.

BACKGROUND

Exemplary embodiments of the present disclosure relate to a structure for multi-stage sealing of a turbine, and more particularly, to a structure for multi-stage sealing of a turbine capable of effectively suppressing a fluid from being leaked between a fixed body and a rotating body of the turbine by forming a honeycomb seal interlocking with a labyrinth seal of the turbine in a multi stage and machining a barrier beam or a barrier groove to induce a formation of a fluid barrier.

In general, a turbine which is a power generating device converting heat energy of fluid such as gas, steam, etc. into rotational force which is mechanical energy, includes a rotor including a plurality of buckets so as to be axially rotated by the fluid, and a casing installed to surround the rotor and including a plurality of diaphragms.

Here, a gas turbine includes a compressor, a combustor, and a turbine, in which as the compressor rotates, outside air is sucked and compressed to be sent to the combustor, and the compressed air and fuel is mixed with each other in the combustor such that combustion is made. High-pressure and high-temperature gas generated in the combustor rotates the rotor of the turbine while passing through the turbine to drive a generator.

In the steam turbine, a high-pressure turbine, a medium-pressure turbine, and a low-pressure turbine are connected in series or in parallel to rotate the rotor. In a case of series connection, the high-pressure turbine, the medium-pressure turbine, and the low-pressure turbine share one rotor.

In the steam turbine, each of the turbines includes the diaphragms and the buckets based on the rotor in the casing, and steam rotates the rotor while passing through the diaphragms and the buckets, thereby driving the generator.

In this case, the gas turbine and the steam turbine have a structure in which the rotating body (rotor) relatively rotates with respect to the fixed body (diaphragm). Therefore, high-temperature and high-pressure fluid may be leaked due to a gap between the fixed body and the rotating body, thereby causing decrease in energy efficiency due to power loss. An effort to decrease the leakage of fluid through the gap between the rotating body and the fixed body has been continuously made.

In order to reduce the leakage of fluid, the gap between the rotating body and the fixed body needs to be minimized first, however, there are various restrictions in narrowing the gap.

For example, if the gap is excessively narrow, interference between the rotating body and the fixed body is caused upon axial rotation of the rotating body, such that vibration is generated due to rubbing, which causes severe damage to the turbine.

Meanwhile, in the steam turbine, since the high-temperature steam introduced from a boiler heats the rotating body and the fixed body, the rotating body and the fixed body expand or contract by several millimeters to several tens of millimeters depending on a position at the time of the operation and the start and stop. Here, since characteristics of materials of the rotating body and the fixed body are different from each other, the rotating body and the fixed body differentially expand, and an expanding direction is also different depending on a turbine structure. Therefore, the interference is caused between the rotating body and the fixed body during the operation, thereby causing rubbing.

A technology of performing sealing by using a brush seal, a honeycomb seal, and a labyrinth seal to reduce a gap between a rotating body and a fixed body in a form in which the honeycomb seal and the labyrinth seal flexibly contact each other may be used in the gas turbine and the steam turbine.

Referring to FIG. 1, in the sealing method using the honeycomb seal and the labyrinth seal, the honeycomb seal 3 is disposed on the fixed body 4 of the turbine, and the labyrinth seal 2 is disposed on the rotating body 1 of the turbine so as to adjacently face the honeycomb seal 3. In this case, a gap between the honeycomb seal 3 and the labyrinth seal 2 is narrowed, and the number of teeth of the labyrinth seal 2 is increased in order to reduce leakage of fluid as shown by arrows illustrated in FIG. 1.

When the gap is narrowed so that the honeycomb seal 3 and the labyrinth seal 2 do not contact each other, a space through which the fluid is leaked is reduced, and when the number of teeth of the labyrinth seal 2 is increased, fluid pressure is decreased every time the fluid passes through the tooth, thereby slowing down the flow of the leaked fluid. As such, the leakage of fluid through the gap between the rotating body 1 and the fixed body 4 is reduced.

However, even through a predetermined gap is formed between the honeycomb seal 3 and the labyrinth seal 2, the gap is changed due to vibration, thermal expansion of a material, etc. during the operation of the turbine, thereby increasing a wear rate of sealing components due to rubbing. This ultimately may lead to damage to a blade or turbine components, and as the sealing components are worn down, sealing capability is degraded, and the fluid is leaked, such that output efficiency of the turbine is deteriorated.

Therefore, an apparatus capable of improving the sealing capability even when the gap between the rotating body 1 and the fixed body 4 is moderately widened depending on the operational environment of the turbine is needed.

BRIEF SUMMARY

An object of the present disclosure is to provide a structure for multi-stage sealing of a turbine capable of effectively suppressing a fluid from being leaked between a fixed body and a rotating body of the turbine by forming a honeycomb seal interlocking with a labyrinth seal of the turbine in a multi stage and machining a barrier beam or a barrier groove to induce a formation of a fluid barrier.

Other objects and advantages of the present disclosure can be understood by the following description, and become apparent with reference to the embodiments of the present disclosure.

In accordance with one aspect of the present disclosure, there is provided a structure for multi-stage sealing of a turbine, including: an annular multi-stage sealing part disposed on an inner circumferential surface of a fixed body and having different heights of at least three stages; and an annular multi-stage tooth part disposed to face the multi-stage sealing part over an outer circumferential surface of a rotating body and provided with a plurality of teeth, having a relative height corresponding to different heights of the multi-stage sealing part at an interval between the fixed body and the rotating body.

The multi-stage sealing part may include: a pair of first sealing parts disposed over the inner circumferential surface of the fixed body while being spaced from each other at a predetermined interval and formed in annular shape; a pair of second sealing parts adjacently disposed to the first sealing part over the inner circumferential surface of the fixed body and formed in an annular shape, having a relatively lower height than the first sealing part; and a third sealing part disposed between the pair of second sealing parts over the inner circumferential surface of the fixed body and formed in an annular shape, having a relatively higher height than the first sealing part.

The multi-stage tooth part may include: an annular first tooth part disposed to face the first sealing part over the outer circumferential surface of the rotating body and formed at a relative height corresponding to a height of the first sealing part; an annular second tooth part disposed to face the second sealing part over the outer circumferential surface of the rotating body and formed at a relative height corresponding to a height of the second sealing part; and an annular third tooth part disposed to face the third sealing part over the outer circumferential surface of the rotating body and formed at a relative height corresponding to a height of the third sealing part.

The multi-stage sealing part may further include: a first barrier groove formed at a flow direction side of a leaked fluid over the first tooth part to hinder a flow of the leaked fluid between the fixed body and the rotating body.

The multi-stage sealing part may further include: a second barrier groove formed at a flow direction side of a leaked fluid over the second tooth part to hinder a flow of the leaked fluid between the fixed body and the rotating body.

The structure may further include: a barrier beam formed at a relatively lower height than the third sealing part and disposed at a central side of the third sealing part to hinder the flow of the leaked fluid in a formation space between the barrier beam and the third tooth part.

In accordance with another aspect of the present disclosure, there is provided a structure for multi-stage sealing of a turbine, including: an annular multi-stage sealing part disposed on an inner circumferential surface of a fixed body and having different heights of at least two stages; a barrier unit disposed at a central side of the multi-stage sealing part on the inner circumferential surface of the fixed body; and an annular multi-stage tooth part disposed to face the multi-stage sealing part or the barrier unit over an outer circumferential surface of a rotating body and provided with a plurality of teeth, having a relative height corresponding to different heights of the multi-stage sealing part or the barrier unit at an interval between the fixed body and the rotating body.

The multi-stage sealing part may include: a pair of first sealing parts disposed over the inner circumferential surface of the fixed body while being spaced from each other at a predetermined interval and formed in annular shape; and a pair of second sealing parts adjacently disposed to the first sealing part over the inner circumferential surface of the fixed body and formed in an annular shape, having a relatively lower height than the first sealing part.

The barrier unit may include: a body part having one side disposed between the pair of second sealing parts over an outer circumferential surface of the fixed body; a protruding part formed at the other side of the body part to change a flow direction of a leaked fluid to form a fluid barrier in a formation space between the protruding part and the multi-stage tooth part; and a depressed part formed at a central side of the body part to hinder a flow of the leaked fluid.

The barrier unit may further include: a crown part disposed at a central side of the protruding part to hinder the flow of the leaked fluid in the formation space between the protruding part and the multi-stage tooth part.

The protruding part and the depressed part may be formed at a flow direction side of the leaked fluid over the body.

It is to be understood that both the foregoing general description and the following detailed description of the present disclosure are exemplary and explanatory.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Hereinafter, a structure for multi-stage sealing of a turbine according to preferred embodiments of the present disclosure will be described in detail with reference to the accompanying drawings.

Figure 1:
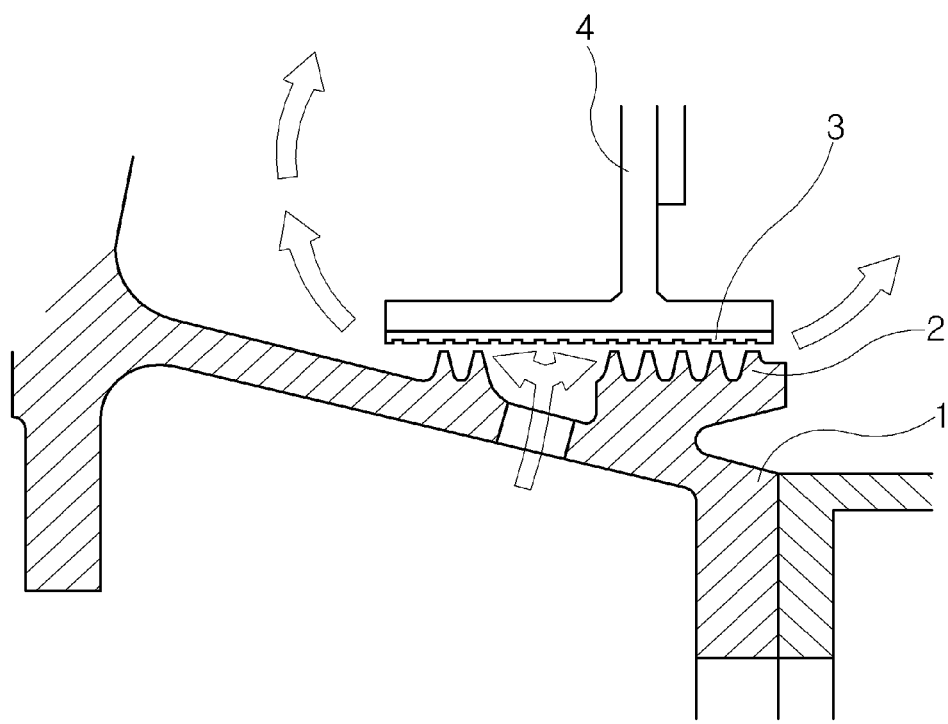
FIG. 1 is a view showing a sealing structure of a turbine according to the related art.
Figure 2:
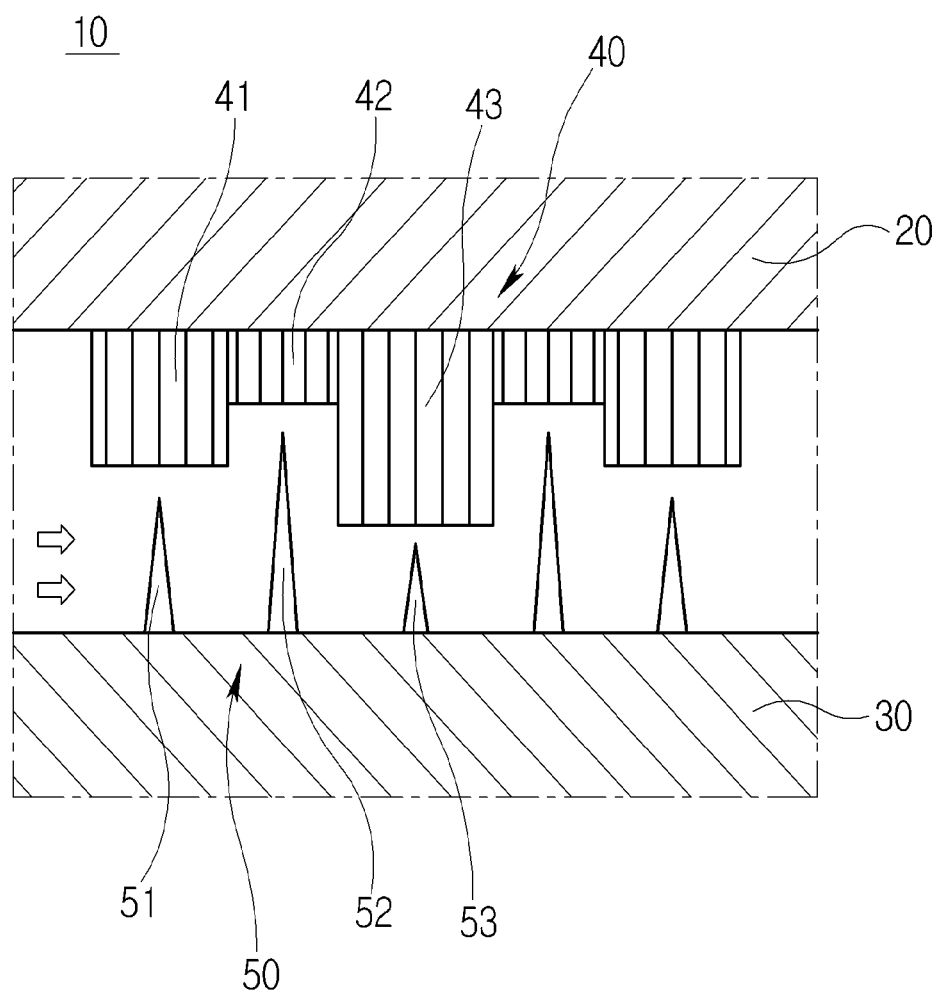
FIG. 2 is a diagram illustrating a structure for multi-stage sealing of a turbine according to a first embodiment of the present disclosure.
Figure 3:
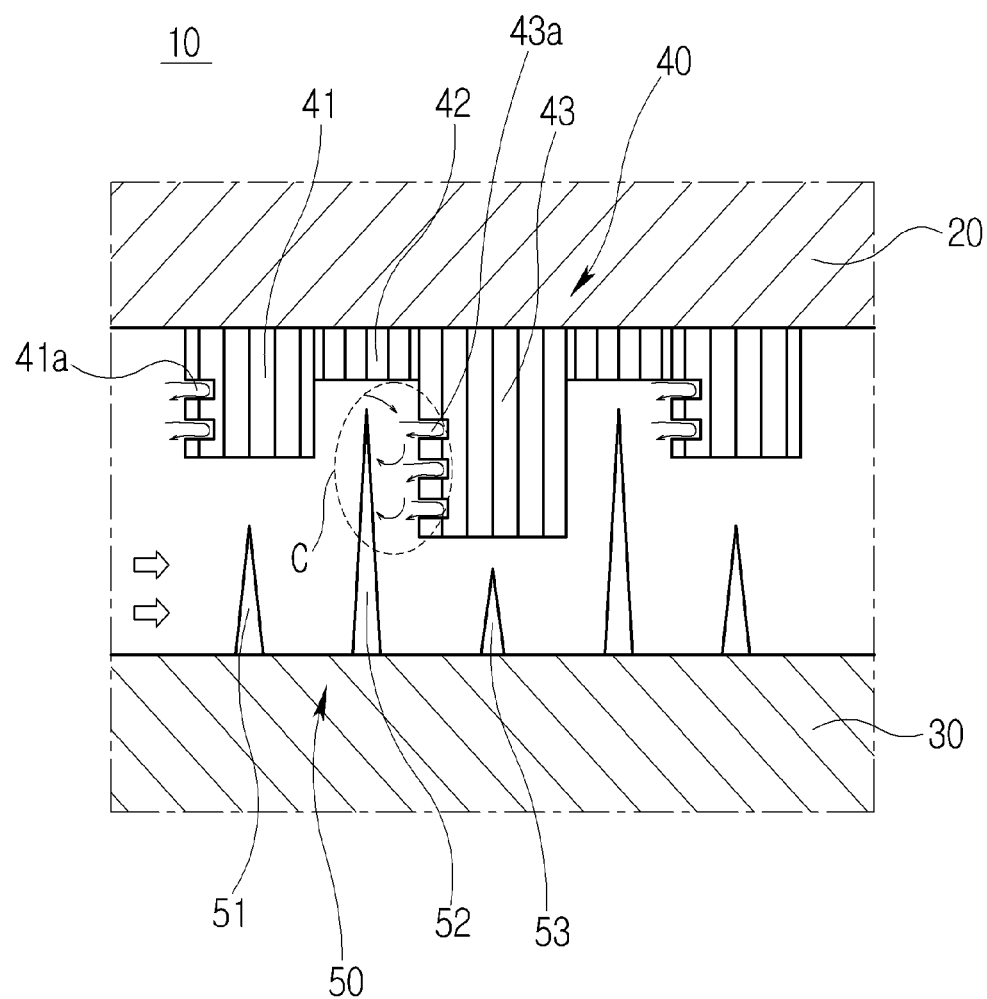
FIG. 3 is a diagram illustrating another embodiment of the present disclosure illustrated in FIG. 2.
Figure 4:
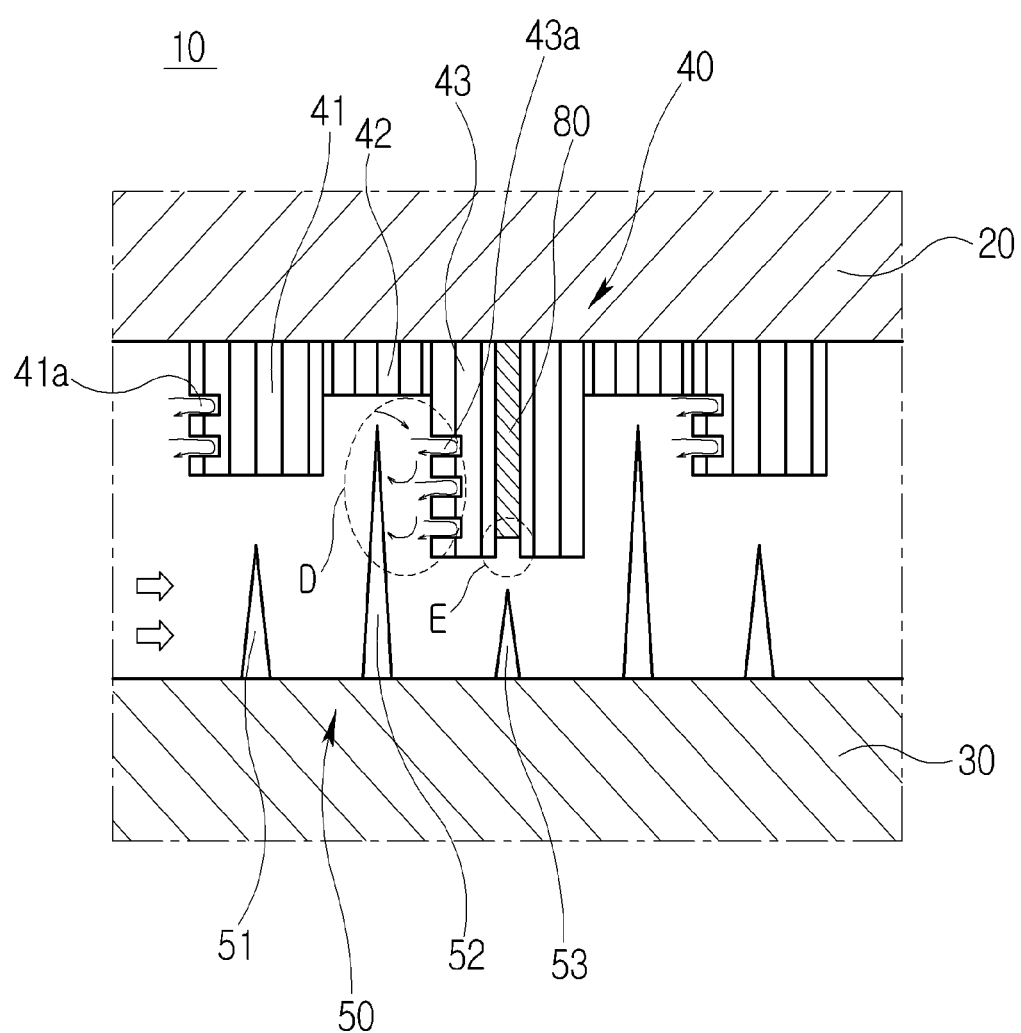
FIG. 4 is a diagram illustrating still another embodiment of the present disclosure illustrated in FIG. 2.

FIG. 2 is a diagram illustrating a structure for multi-stage sealing of a turbine according to a first embodiment of the present disclosure, FIG. 3 is a diagram illustrating another embodiment of the present invention illustrated in FIG. 2, and FIG. 4 is a diagram illustrating still another embodiment of the present disclosure illustrated in FIG. 2.

Referring to FIGS. 2 to 4, the structure for multi-stage sealing of a turbine according to the first embodiment of the present disclosure may be configured to include a multi-stage sealing part 40 and a multi-stage tooth part 50.

The multi-stage sealing part 40 is disposed on an inner circumferential surface of a fixed body 20 such as a casing and a diaphragm and may be formed in an annular shape, having different heights of at least three stages. The multi-stage sealing part 40 may be a honeycomb seal and may include a first sealing part 41, a second sealing part 42, and a third sealing part 43.

The first sealing part 41 may include a pair of sealing parts on the inner circumferential surface of the fixed body 20 spaced apart from each other at a predetermined interval and may be formed in an annular shape. Further, the second sealing part 42 is disposed between the pair of first sealing parts 41 on the inner circumferential surface of the fixed body 20 and may be formed in a pair of annular shapes, having a relatively lower height than the first sealing part 41.

Further, the third sealing part 43 is disposed between the pair of second sealing parts 42 on the inner circumferential surface of the fixed body 20 and may be formed in an annular shape, having a relatively higher height than the first sealing part 41.

The first sealing part 41, the second sealing part 42, and the third sealing part 43 form a specific space as illustrated in FIG. 2 due to the foregoing height difference. Here, the multi-stage sealing part 40 is not necessarily limited to three stages, and therefore may be implemented as a plural stages of honeycomb seal, etc., that has different heights depending on the applied environment.

Next, the multi-stage tooth part 50 is disposed to face the multi-stage sealing part 40 over an outer circumferential surface of a rotating body 30 such as a shaft and a bucket and may be formed in an annular shape in which a plurality of teeth are formed, having a relative height corresponding to the different heights of the multi-stage sealing part 40 at a gap between the fixed body 20 and the rotating body 30. The multi-stage tooth part 50 may be a labyrinth seal and may be configured to include a first tooth part 51, a second tooth part 52, and a third tooth part 53.

The first tooth part 51 is disposed to face the first sealing part 41 over the outer circumferential surface of the rotating body 30 and may be formed in an annular shape formed at a relative height corresponding to the height of the first sealing part 41. Further, the second tooth part 52 is disposed to face the second sealing part 42 over the outer circumferential surface of the rotating body 30 and may be formed in an annular shape formed at a relative height corresponding to the height of the second sealing part 42.

Further, the third tooth part 53 is disposed to face the third sealing part 43 over the outer circumferential surface of the rotating body 30 and may be formed in an annular shape formed at a relative height corresponding to the height of the third sealing part 43.

The first tooth part 51, the second tooth part 52, and the third tooth part 53 each form a specific space that may suppress the leakage of fluid as illustrated in FIG. 2 due to the relative height difference from the first sealing part 41, the second sealing part 42, and the third sealing part 43.

The leaked fluid meanderingly flows between the multi-stage sealing part 40 and the multi-stage tooth part 50 that are formed at various heights, and therefore the flow thereof is slow and stagnated. This serves to suppress the leakage of fluid.

Here, the multi-stage tooth part 50 is not necessarily limited to three stages, and therefore may be implemented as a labyrinth seal of plural stages, etc., that has different heights depending on the number of plural stages of the multi-stage sealing part 40 or the applied environment.

According to another embodiment of the present disclosure, as illustrated in FIG. 3, a structure for multi-stage sealing of a turbine may be configured to further include a first barrier groove 41a and a second barrier groove 43a.

First, the first barrier groove 41a may be formed in an annular shape at a flow direction side of the leaked fluid over the first tooth part 51 to hinder the flow of the leaked fluid between the fixed body 20 and the rotating body 30. First, the second barrier groove 43a may be formed in an annular shape at a flow direction side of the leaked fluid over the second tooth part 52 to hinder the flow of the leaked fluid between the fixed body 20 and the rotating body 30.

In detail, the first barrier groove 41a may be machined in plural stages to be vertical to an introduction direction side of the leaked fluid over the first tooth part 51. This may be implemented by a 3D printer technology, etc. The leaked fluid suffers from the flow resistance in the first barrier groove 41a and thus the flow thereof is slow when the leaked fluid passes through a narrow path between the first sealing part 41 and the first tooth part 51.

Next, the leaked fluid of which the flow is weakened is introduced into the narrow path formed between the second sealing part 42 and the second tooth part 52. In this case, the leaked fluid meanderingly flows due to the relative height difference between the first sealing part 41 and the second sealing part 42, and therefore the flow of fluid is slow once again.

The leaked fluid passing through a passage between the second sealing part 42 and the second tooth part 52 again suffers the flow resistance in a formation space C between the second barrier groove 43a machined in plural stages in a vertical direction over the third sealing part 43 and the second tooth part 52. Here, the third sealing part 43 may also be implemented by a 3D printer technology, or the like.

That is, the leaked fluid has a micro vortex by the second barrier groove 43a of plural stages formed in the vertical direction over the third sealing part 43, which forms a fluid barrier in the formation space C between the barrier groove 43a and the second tooth part 52. By doing so, the leakage of fluid is suppressed.

Further, the leaked fluid passing through the formation space C needs to meanderingly pass through subsequent narrow paths including a narrow path between the third sealing part 43 and the third tooth part 53 again, and therefore the leakage blocking effect of fluid is increased more than the existing simple disposition structure between the honeycomb seal and the labyrinth seal.

Next, according to another embodiment of the present disclosure, referring to FIG. 4, a structure for multi-stage sealing of a turbine may further include the fixed body 20 and a metal barrier beam 80, which may be formed of the same material. The barrier beam 80 is formed to have a relatively lower height than the third sealing part 43 to hinder the flow of the leaked fluid in a formation space between the barrier beam 80 and the third tooth part 53 and may be formed in an annular shape at a central side of the third sealing part 43.

The flow of the leaked fluid flowing at a slow speed due to a fluid barrier D formed by the second barrier groove 43a is hindered once again in a narrow interval between the third sealing part 43 and the third tooth part 53 and the formation space E between the barrier beam 80 and the third tooth part 53. As a result, the leaked fluid is stagnated in the narrow path formed among the third sealing part 43, the third tooth part 53, and the barrier beam 80, which forms a subsequent micro fluid barrier.

That is, according to the first embodiment of the present disclosure, the leaked fluid flows at a low speed and is stagnated due to the fluid flow resistance and the fluid barrier by the first and second barrier grooves 41a and 43a of plural stages and the barrier groove 80 that are formed on the multi-stage sealing part 40, and therefore the sealing performance is increased more than the existing sealing structure between the honeycomb seal and the labyrinth seal.

Figure 5:
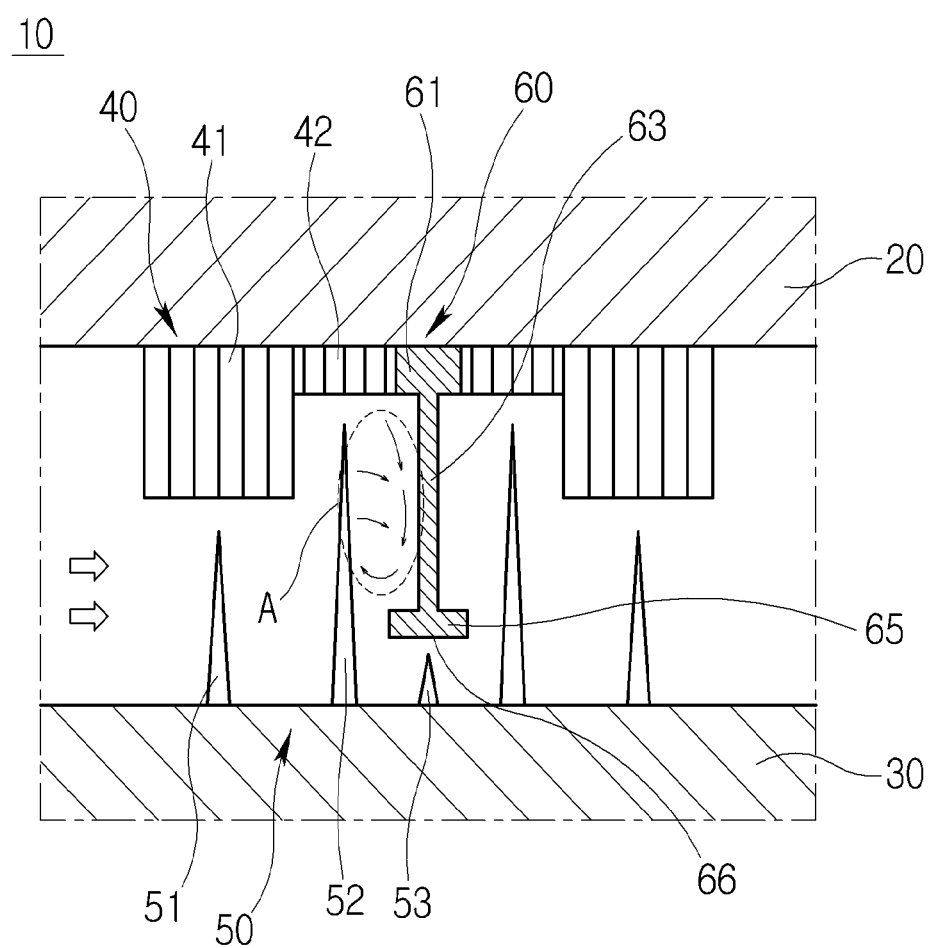
FIG. 5 is a diagram illustrating a structure for multi-stage sealing of a turbine according to a second embodiment of the present disclosure.
Figure 6:
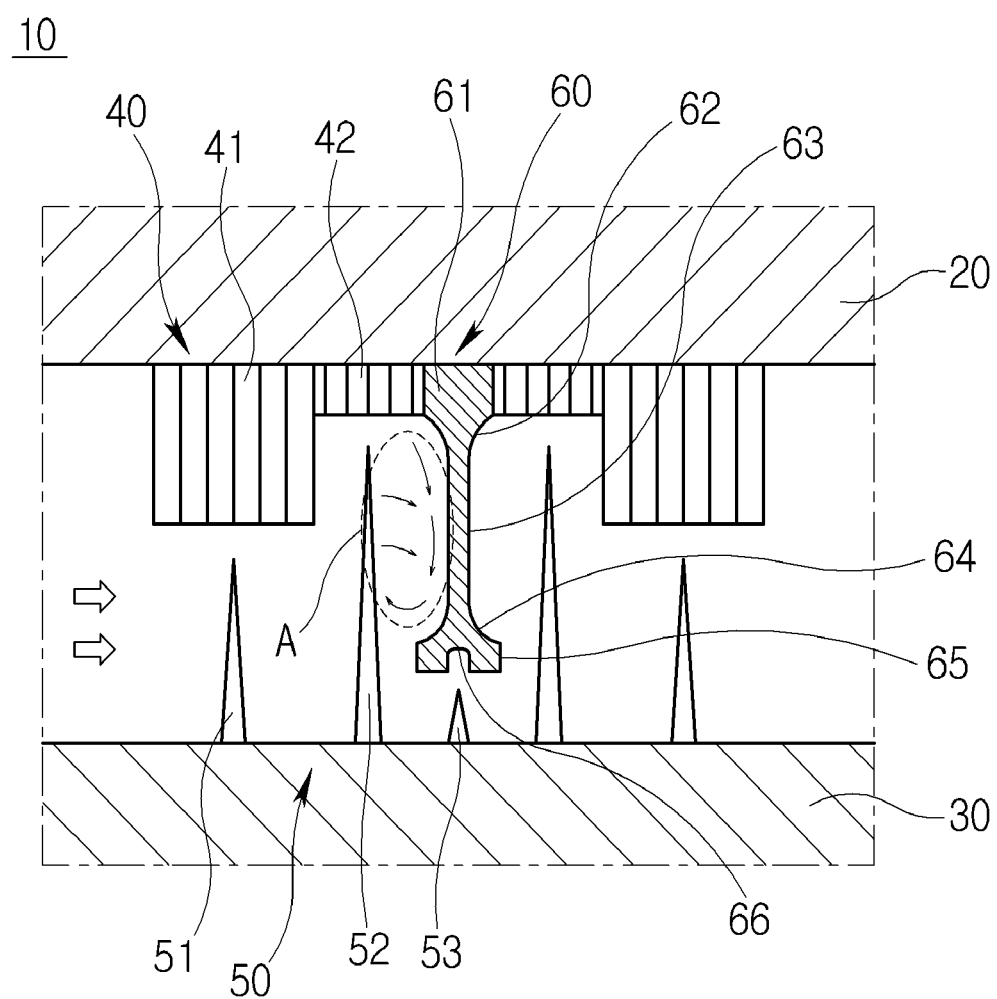
FIG. 6 is a diagram illustrating another embodiment of the present disclosure illustrated in FIG. 5.
Figure 7:
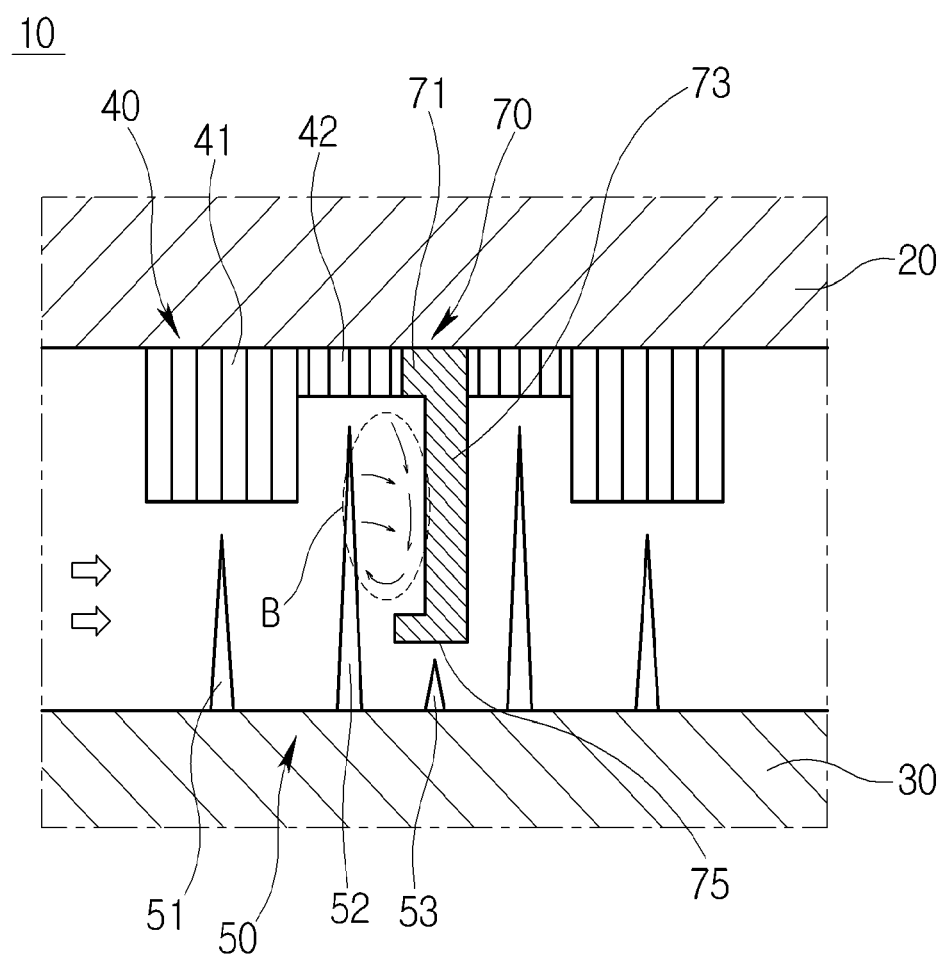
FIG. 7 is a diagram illustrating still another embodiment of the present disclosure illustrated in FIG. 5.
Figure 8:
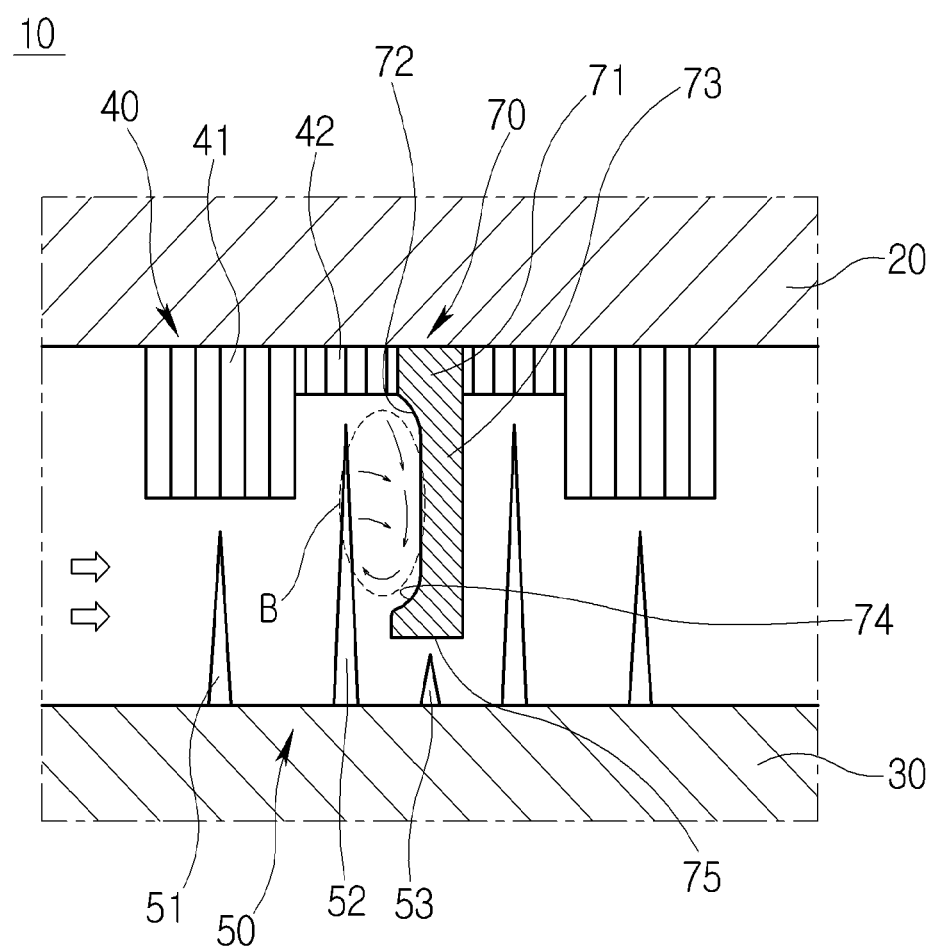
FIG. 8 is a diagram illustrating still yet another embodiment of the present disclosure illustrated in FIG. 5.

FIG. 5 is a diagram illustrating a structure for multi-stage sealing of a turbine according to a second embodiment of the present disclosure, FIG. 6 is a diagram illustrating another embodiment of the present disclosure illustrated in FIG. 5, FIG. 7 is a diagram illustrating still another embodiment of the present disclosure illustrated in FIG. 5, and FIG. 8 is a diagram illustrating still yet another embodiment of the present disclosure illustrated in FIG. 5.

Referring to FIGS. 5 to 8, the structure for multi-stage sealing of a turbine according to the second embodiment of the present disclosure may include the multi-stage sealing part 40, barrier units 60 and 70, and the multi-stage tooth part 50.

The multi-stage sealing part 40 is disposed on an inner circumferential surface of a fixed body 20 such as a casing and a diaphragm and may be formed in an annular shape having different heights of at least two stages. The multi-stage sealing part 40 may be the honeycomb seal and may be configured to include the first sealing part 41 and the second sealing part 42.

The first sealing part 41 may include a pair of sealing parts on the inner circumferential surface of the fixed body 20 while being spaced apart from each other at a predetermined interval and may be formed in an annular shape. Further, the second sealing part 42 is disposed between the pair of first sealing parts 41 on the inner circumferential surface of the fixed body 20 and may be formed in a pair of annular shapes, having a relatively lower height than the first sealing part 41.

The first sealing part 41 and the second sealing part 42 form a specific space as illustrated in FIG. 5 due to the foregoing height difference. Here, the multi-stage sealing part 40 is not necessarily limited to two stages, and may be implemented as the honeycomb seal of plural stages, etc., that has different heights depending on the applied environment.

Next, the multi-stage tooth part 50 is disposed to face the multi-stage sealing part 40 over the outer circumferential surface of the rotating body 30 such as the shaft and the bucket and may be formed in the annular shape in which a plurality of teeth are formed, having a relative height corresponding to the different heights of the multi-stage sealing part 40 at the gap between the fixed body 20 and the rotating body 30. The multi-stage tooth part 50 may be the labyrinth seal and may be configured to include the first tooth part 51 and the second tooth part 52.

The first tooth part 51 is disposed to face the first sealing part 41 over the outer circumferential surface of the rotating body 30 and may be formed in the annular shape formed at the relative height corresponding to the height of the first sealing part 41. Further, the second tooth part 52 is disposed to face the second sealing part 42 over the outer circumferential surface of the rotating body 30 and may be formed in the annular shape formed at the relative height corresponding to the height of the second sealing part 42.

The first tooth part 51 and the second tooth part 52 each form the specific space that may suppress the leakage of fluid as illustrated in FIG. 5 due to the relative height difference between the first sealing part 41 and the second sealing part 42.

The leaked fluid meanderingly flows between the multi-stage sealing part 40 and the multi-stage tooth part 50 that are formed at various heights, and therefore the flow thereof is slow and stagnated. This serves to suppress the leakage of fluid.

Here, the multi-stage tooth part 50 is not necessarily limited to two stages, and therefore may be implemented as the labyrinth seal of plural stages, etc., that has different heights depending on the number of plural stages of the multi-stage sealing part 40 and the applied environment.

Next, the barrier unit 60 may be formed in the annular shape at the central side of the multi-stage sealing part 40 on the inner circumferential surface of the fixed body 20. The barrier unit 60 may include a body part 61, a protruding part 65, a depressed part 63, and a crown part 66. Further, the barrier unit 60 may be made of the same metal material as the material of the fixed body 20.

One side of the body part 61 may be disposed between the pair of second sealing parts 42 on the outer circumferential surface of the fixed body 20. One side of the body part 61 may be machined in the form in which it is more extended in a horizontal direction than a central side of the body part 61 and thus has a wide contact area so as to be stably seated in the fixed body 20. Further, one side of the body part 61 may be welded to the inner circumferential surface of the fixed body 20. Of course, the present embodiment is not necessarily limited thereto and therefore one side of the body part 61 may be separably coupled with the inner circumferential surface of the fixed body 20 by a bolt fastened scheme.

Next, the depressed part 63 may be formed at the central side of the body part 61 to hinder the flow of the leaked fluid. Referring to FIG. 5, the form in which the central side of the body part 61 is depressed in both directions may be confirmed.

The leaked fluid passing through the narrow path between the second sealing part 42 and the second tooth part 52 is temporarily isolated in the depressed part 63. This hinders the flow of the leaked fluid, and as a result fluid flow resistance occurs in a space A formed by the sealing part 42, the second tooth part 52, and the depressed part 63. This slows down and stagnates the flow of the leaked fluid.

Here, the protruding part 65 may be formed at the other side of the body part 61 so that it changes the flow direction of the leaked fluid to form a fluid barrier in the formation space A with the multi-stage tooth part 50.

Referring back to FIG. 5, the other side of the body part 61 is provided with the protruding part 65 and, reviewing a flow (flow of the leaked fluid) of an arrow illustrated in FIG. 5, the flow direction of the leaked fluid flowing along the protruding part 63 is changed by the protruding part 65 and thus the leaked fluid is turned in the direction of the second tooth part 52.

This ultimately forms a fluid barrier in the formation space A with the second tooth part 52 and greatly slows down the flow of the leaked fluid. That is, the barrier unit 60 is disposed in the pair of second sealing parts 42 and thus the leakage of fluid between the fixed body 20 and the rotating body 30 may be more reliably limited or blocked.

Meanwhile, referring to FIG. 6, according to another embodiment of the present disclosure, the barrier unit 60 may include radiused parts 62 and 64 and a crown part 66.

First, the radiused parts 62 and 64 may be formed at a portion continued from one side 61 of the body part 61 to the depressed part 63 and a portion continued from the depressed part 63 to the protruding part 65. As the radiused parts 62 and 64 are formed, the leaked fluid smoothly flows along the depressed part 63 and then the direction thereof is changed at the protruding part 65 and a fluid barrier is formed at the formation space A with the second tooth part 52.

Here, the crown part 66 may be machined at a central side of the protruding part 65 to hinder the flow of the leaked fluid in the formation space between the protruding part 65 and the multi-stage tooth part 50, in detail, the third tooth part 53. When passing between the crown part 66 and the third tooth part 53, the flow of the leaked fluid passing through the fluid barrier on the formation space A between the protruding part 65 and the second tooth part 52 meanders once again, which increases the stagnation of the flow of the leaked fluid.

In addition, the crown part 66 may serve to prevent the third tooth part 53 from colliding with the barrier unit 60 when the interval between the fixed body 20 and the rotating body 30 is changed during the operation of the turbine. That is, when the rotating body 30 vibrates in a radial direction during the operation of the turbine, the third tooth part 53 may be inserted into an inner groove of the crown part 66, and thus the flowing width of the third tooth part 53 is secured, thereby preventing the turbine from being damaged.

Next, the leaked fluid passing through the crown part 66 suffers from the fluid flow resistance due to the same fluid barrier even in the depressed part 63 formed at an opposite center of the body part 61, thereby obtaining the double sealing effect.

Meanwhile, referring to FIGS. 7 and 8, according to another embodiment of the present disclosure, in the barrier unit 70, the protruding part 75 and the depressed part 73 may be formed only in the flow direction of the leaked fluid on the body part 71. In this case, the flow of the leaked fluid is slow and stagnated in the formation space B illustrated in FIGS. 7 and 8 on one side of the depressed part 73 due to the fluid flow resistance and the fluid barrier.

That is, according to the second embodiment of the present disclosure, the fluid flow resistance is induced and the fluid barrier is formed, by the barrier units 60 and 70 disposed on the multi-stage sealing part 40 to slow down and stagnate the flow of the leaked fluid, thereby improving the sealing performance than the existing honeycomb seal and labyrinth seal structure.

According to the embodiments of the present disclosure, the honeycomb seal that is disposed in the fixed body of the casing, the diaphragm, etc. of the turbine may be implemented as a multi stage seal as well as the labyrinth seal of the rotating body of the shaft, the bucket, etc. of the turbine interworking with the honeycomb seal may be also implemented as multi stage to meander the flow of the leaked fluid between the fixed body and the rotating body of the turbine, thereby suppressing the flow.

Further, the barrier beam may be disposed at the central side of the honeycomb seal to form a fluid barrier in the formation space between the barrier beam and the labyrinth seal to hinder the flow of the leaked fluid and slow the flow of fluid flow subsequently introduced.

Further, a plurality of barrier grooves may be machined along the vertical direction of the honeycomb seal at the introduction direction of the leaked fluid and therefore the leaked fluid suffers from the flow resistance due to the barrier groove, such that a micro fluid vortex is formed in the formation space between the barrier groove and the labyrinth seal, thereby obtaining an effect as a fluid barrier.

The above-described effects may reduce or minimize output loss due to the leakage of fluid, thus the efficiency of the turbine may be improved, and lifespan and replacement period of the sealing components may be extended, thereby reducing maintenance cost for the turbine.

The above matters describe only examples of specific embodiments of a structure for multi-stage sealing of a turbine.

Therefore, it will be apparent to those skilled in the art that various changes and modifications may be made without departing from the spirit and scope of the following claims.

Moreover, the above advantages and features are provided in described embodiments, but shall not limit the application of the claims to processes and structures accomplishing any or all of the above advantages.

What is claimed is:

1. A multi-stage seal for a turbine, comprising:
   a fixed body;
   a rotating body spaced from the fixed body by a gap through which a fluid leaks;
   an annular multi-stage seal composed of seal stages having different heights, respectively, and disposed on an inner circumferential surface of the fixed body, the seal stages including a pair of first seals, a pair of second seals, and a third seal;
   an annular multi-stage tooth disposed so as to protrude radially from an outer circumferential surface of the rotating body and to face the annular multi-stage seal and provided with a plurality of teeth having relative heights corresponding to the different heights of the seal stages, respectively, the annular multi-stage tooth including a pair of annular first teeth disposed to face the first seals, a pair of annular second teeth disposed to face the second seals, and an annular third tooth disposed to face the third seal; and
   a barrier beam disposed at an axially central portion of the third seal and configured to impede a flow of the leaked fluid in a formation space between the third tooth and a distal end of the barrier beam.

2. The seal of claim 1, wherein
   the pair of first seals are spaced from each other at an interval and have an annular shape;
   the pair of second seals are disposed adjacent to the first seals, have an annular shape, and have a height lower than the first seals; and
   the third seal is disposed between the pair of second seals, has an annular shape, and has a height higher than the first seals.

3. The seal of claim 2, wherein
   the pair of annular first teeth have relative heights corresponding to heights of the first seals;
   the pair of annular second teeth have relative heights corresponding to heights of the second seals; and
   the annular third tooth has a relative height corresponding to a height of the third seal.

4. The seal of claim 1, wherein the multi-stage seal includes at least one of
   a first barrier groove disposed at a flow direction side of a first tooth part to impede the flow of the leaked fluid between the fixed body and the rotating body; and
   a second barrier groove disposed at a flow direction side of a second tooth part to impede the flow of the leaked fluid between the fixed body and the rotating body.

5. The seal of claim 4, wherein the multi-stage seal includes the first barrier groove.

6. The seal of claim 4, wherein the multi-stage seal includes the second barrier groove.

7. The seal of claim 4, wherein the multi-stage seal includes the first barrier groove and the second barrier groove.

8. The seal of claim 1, wherein the barrier beam has a height lower than a height of the third seal.

* * * * *